United States Patent [19]

Vistain

[11] Patent Number: 4,532,712
[45] Date of Patent: Aug. 6, 1985

[54] PROXIMITY MEASURING DEVICE FOR GOLFERS

[76] Inventor: James E. Vistain, 1320 Bonnie Glen, Glenview, Ill. 60025

[21] Appl. No.: 528,645

[22] Filed: Sep. 1, 1983

[51] Int. Cl.³ .............................................. G01B 3/10
[52] U.S. Cl. ...................................... 33/180; 33/1 LE; 33/138; 33/508; 273/DIG. 21
[58] Field of Search ................. 33/137 R, 138, 137 L, 33/1 LE, 369, 413, 414, 173, 27 C, 27 R, 1 CC, 1 MD, 174 F; 273/DIG. 21, 34 R

[56]     References Cited
U.S. PATENT DOCUMENTS

| 2,673,398 | 3/1954  | Baumgart | 33/414 X |
| 3,418,719 | 12/1968 | Davis    | 33/137 R |
| 3,745,663 | 7/1973  | Dodge    | 33/173   |
| 3,834,030 | 9/1974  | Hanson   | 33/138   |

Primary Examiner—William D. Martin, Jr.
Attorney, Agent, or Firm—Hill, Van Santen, Steadman & Simpson

[57]     ABSTRACT

A proximity comparing device for golfers for determining relative distances of golf balls from a flagstick which includes a clamping ring to releasably engage the flagstick while permitting sliding movement of the clamping ring about the periphery of the flagstick in combination with a string which has one end anchored to the clamping ring and another end received in a reel. The reel is preferably formed with an inner opening which is just slightly larger than the diameter of a ball so that adjustable amounts of string are played out or received in the reel making it a relatively simple matter to determine promptly which of two golf balls is farthest from the flagstick.

7 Claims, 4 Drawing Figures

U.S. Patent  Aug. 6, 1985  4,532,712
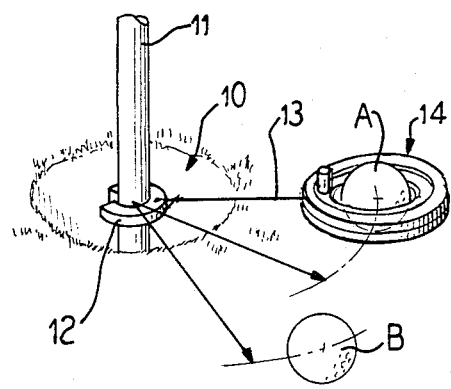
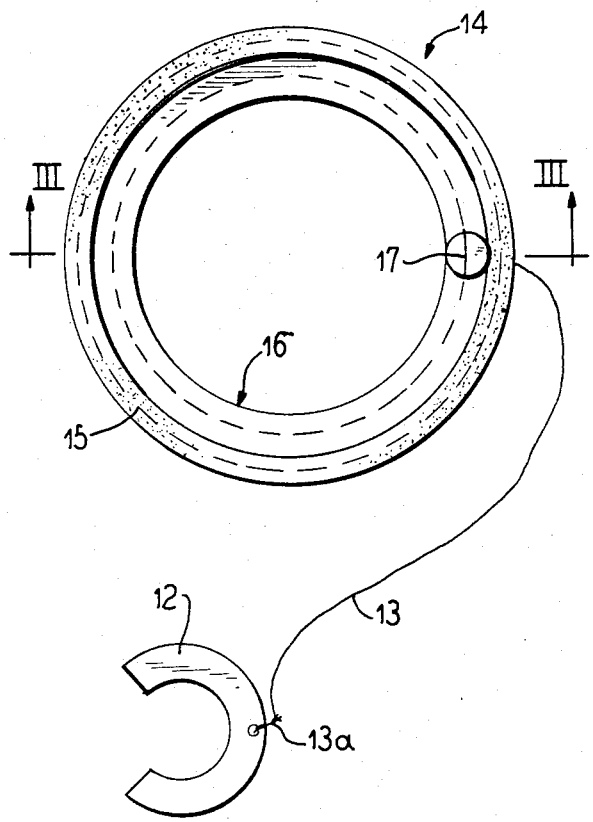
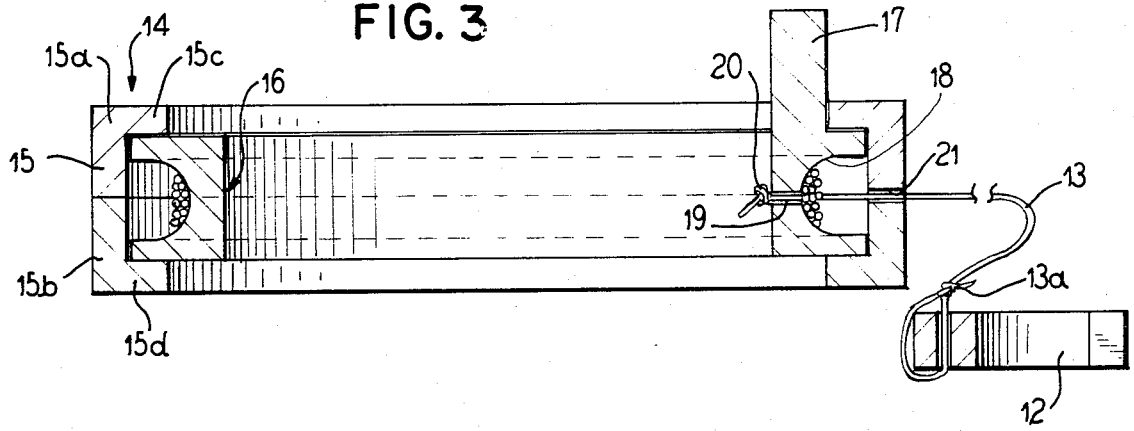
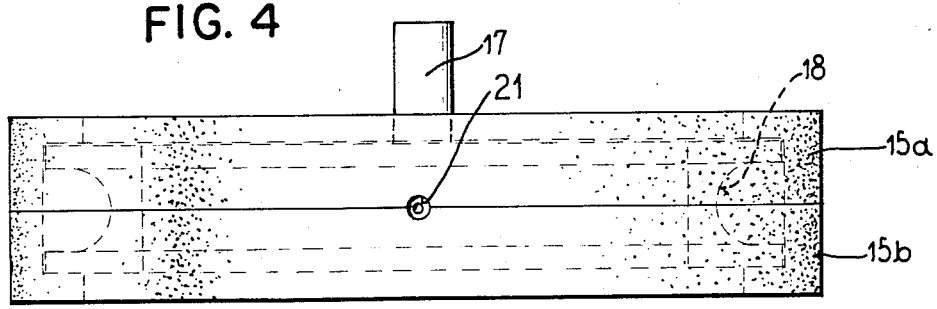

PROXIMITY MEASURING DEVICE FOR GOLFERS

BACKGROUND OF THE INVENTION

1. Field of the Invention

This invention is in the field of proximity comparing devices for measuring relative distances to a flagstick and including a clamping ring which is received in releasable engagement with the flagstick and a reel which provides adjustable amounts of string from the clamping ring to the ball being measured, thereby enabling the user to readily ascertain which of two balls is farther from the flagstick.

2. Description of the Prior Art

In numerous instances in the game of golf, it is necessary to determine which of two balls is farthest from the flagstick since the Rules of Golf require that the player whose ball is farthest from the flagstick play first.

Many golfers participate in a game among their foursome wherein points are awarded for the longest drive, for the first player to reach the putting green, for being closest to the flagstick while on the putting green, and finally for the first to hole out his putt. In that type of sport, it becomes important to determine which of the balls is nearest to the flagstick to determine the award of points and also to determine which player is entitled to go first.

When two balls are on a putting green, each at a substantial distance from the flagstick, it is very difficult to determine by eye which is the closer to the flagstick. This is particularly true if the balls are on opposite sides of the putting green. Heretofore, some players have gone to the extreme of carrying a measuring tape in their bags. When the two balls being measured are sufficiently far apart, however, it takes two players to make the measurements, one to hold the end of the measuring tape against the rim of the cup and the other to do the actual measuring.

The time-honored manner of determining which player is "away" when the two balls are relatively close to the hole consists in measuring the distances with the flagstick itself. However, this is also a two-man undertaking since one player must hold the base of the flagstick against the rim of the cup while the other player does the measuring. This process takes a substantial amount of time and is limited to balls which are no more than the length of a flagstick away from the hole.

SUMMARY OF THE INVENTION

The proximity comparing device of the present invention includes a clamping ring composed of a synthetic resin or other low friction material which is releasably engageable with the flagstick while still permitting the clamping ring to slide about the periphery thereof. In the preferred form of the invention, the clamping ring is a segmented ring subtending an angle greater than 180°. The clamping ring serves to anchor the end of a string whose other end is received in a reel composed of two coaxial rings nested within each other. The inner ring is rotatable relative to the outer ring and has a peripheral groove extending radially inwardly from its outer periphery. The groove serves to seat the string being wound and unwound and permits level winding of the string within the groove. The inner diameter of the inner ring is slightly larger than that of a standard golf ball. Consequently, a single player can clamp the clamping ring to the flagstick, and then play out enough string from the reel to permit the inner reel to be received about the golf ball. Then the player either holds the string or prevents relative rotation between the inner and outer rings, while he moves to the other ball being measured and repeats the process. It is a simple matter, therefore, to determine which of the two balls is farthest from the flagstick.

BRIEF DESCRIPTION OF THE DRAWINGS

A further description of the present invention will be made in conjunction with the attached sheet of drawings in which:

FIG. 1 is a somewhat diagrammatic view showing how the proximity measuring device of the present invention is used;

FIG. 2 is a plan view of the reel and clamping ring assembly;

FIG. 3 is a cross-sectional view taken substantially along the line III—III of FIG. 2; and FIG. 4 is a front elevational view of the reel assembly.

DESCRIPTION OF THE PREFERRED EMBODIMENTS

In FIG. 1, reference numeral 10 has been applied generally to a golf hole of standard size located on a putting green. A flagstick 11 has its lower end detachably seated in the bottom of the cup 10 in the conventional way.

In accordance with the present invention, I provide a clamping ring 12 which is arranged to fit snugly about the perimeter of the flagstick 11. As illustrated best in FIG. 2, the clamping ring 12 may be generally C-shaped and consists of a segmented annulus which subtends an angle greater than 180°. The clamping ring 12 may be made of any suitable low-friction material such as polyvinyl chloride, polyethylene, polypropylene, polytetrafluoroethylene ("Teflon") or other suitable material having a low coefficient of friction.

Secured to clamping ring 12 is one end of a string 13 as by means of a knot 13a. The string 13 may be composed of any suitable material such as a fishing line made of nylon or the like.

Varying amounts of string 13 are provided by a reel structure generally indicated at reference numeral 14. This reel structure can also be composed of a suitable synthetic resinous material or of metal. The reel structure 14 consists of an outer ring 15 which may be composed of two identical rings 15a and 15b for manufacturing convenience. The upper ring 15a has a radially inwardly extending marginal flange portion 15c and a corresponding flange portion 15d extends from the ring 15b.

Received in coaxial alignment with the outer ring 15 is an inner ring generally indicated at reference numeral 16. The inner ring is received between the flanges 15c and 15d which prevent relative axial movement between the two rings. It is received sufficiently loosely within the outer ring 15, however, to permit relative rotational movement between the two rings. A pin-type handle 17 integral with or secured to the inner ring 16 provides for such relative rotative movement.

As best seen in FIG. 3 the inner ring 16 is provided with an arcuate groove 18 extending radially inwardly from its periphery. At the inner end of the groove 18 there is an aperture 19 through which the other end of the string 13 extends, the string being formed with a knot 20 to prevent the string from being withdrawn. The arcuate nature of the groove permits level winding of the string 13 within the groove, since the turns of string at the base of the groove are few in number and become greater as more string is wound thereon. The string 13 is let out through the outer ring 15 by providing an aperture 21 preferably at the junction between the ring sections 15a and 15 b.

The operation of the proximity measuring device should be evident from the illustration of FIG. 1. Shown in FIG. 1 are a pair of golf balls A and B whose distance from the flagstick 11 is to be determined. The player first snaps the clamping ring 12 against the flagstick 11 and then plays out enough string from the reel 14 until the ball A is received within the closely fitting interior of the inner ring 16. The player then either pinches the string at the aperture 21 or presses the inner ring 16 into wedged engagement with the outer ring 15 so that it cannot rotate. He then moves the reel to the second ball B. Since the reel 14 does not fit over the ball B but is closer to the flagstick, it is obvious that ball B is farther from the flagstick than ball A and must be played first.

The device of the present invention thus provides a simple but accurate means for determining which golf ball on a putting green is farthest from the flagstick. The device can easily be handled by one person and is considerably quicker than attempting to measure the distance with a measuring tape or by using the flagstick itself as a measuring device.

It should be evident that various modifications can be made to the described embodiments without departing from the scope of the present invention.

I claim as my invention:

1. A proximity comparing device for golfers to determine relative distance of golf balls from a flagstick comprising:

a clamping ring releasably engageable with said flagstick and having a sufficiently low coefficient of friction to be slidable about the periphery thereof while engaging said flagstick, a string having one end anchored to said clamping ring, and a reel securing the opposite end of said string and providing a variable amount of string for measuring distances from said flagstick, said reel including a pair of concentric inner and outer rings rotatable relative to each other, the other end of said string being wound about said inner ring and said outer ring permitting entry and withdrawal of said string from about said inner ring.

2. A device according to claim 1 in which:

said inner ring has an internal diameter slightly larger than the diameter of a golf ball.

3. A device according to claim 1 which includes:

a pin on said inner ring for rotating said inner ring within said outer ring.

4. A device according to claim 1 in which:

said outer ring has an aperture through which said string extends, and said inner ring has an arcuate groove extending radially inwardly from its outer periphery receiving the string passing through said aperture and functioning to permit level winding of said string within said groove.

5. A device according to claim 4 in which:

said arcuate groove has an aperture therethrough at the inner extremity of said groove, said string passing through said aperture and being secured thereagainst.

6. A device according to claim 1 in which:

said clamping ring is a segmented annulus subtending an angle greater than 180°.

7. A proximity comparing device for golfers for determining relative distances of golf balls from a flagstick comprising:

a C-shaped clamping ring proportioned to be releasably clamped about said flagstick and having a sufficiently low coefficient of friction to be slidable about the flagstick when clamped thereto, a string having one end secured to said clamping ring, a reel consisting of an outer ring and an inner ring disposed coaxially within said outer ring and being rotatable relative thereto, said inner ring having an internal diameter slightly larger than the diameter of a golf ball, said inner ring further having an arcuate groove extending radially inwardly from its periphery, and having an aperture extending through the inner extremity of said groove, the other end of said string being received through said aperture and being seated thereagainst to prevent withdrawal through said aperture.

* * * * *